R. H. ATZ.
MARKER FOR PLANTERS.
APPLICATION FILED APR. 12, 1919.
1,372,637.
Patented Mar. 22, 1921.
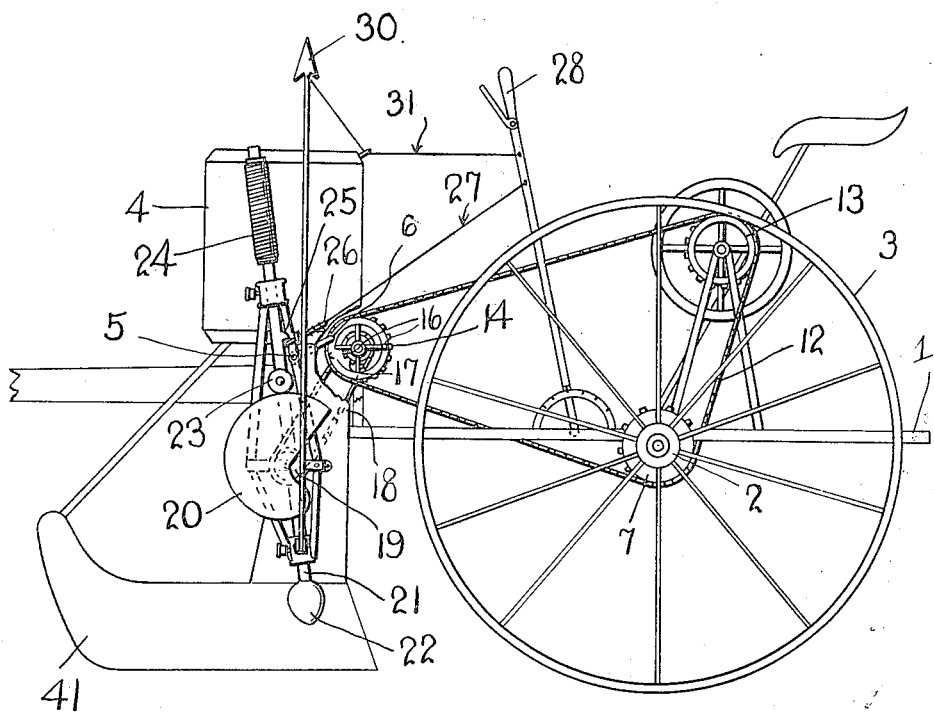
Witnesses
Inventor
Ralph H. Atz
Attorney

UNITED STATES PATENT OFFICE.

RALPH H. ATZ, OF KENDALLVILLE, INDIANA.

MARKER FOR PLANTERS.

1,372,637.

Specification of Letters Patent.   Patented Mar. 22, 1921.

Application filed April 12, 1919.   Serial No. 289,522.

*To all whom it may concern:*

Be it known that I, RALPH H. ATZ, a citizen of the United States, residing at Kendallville, in the county of Noble and State of Indiana, have invented new and useful Improvements in Markers for Planters, of which the following is a specification.

My present invention pertains to seed planters, and consists in the peculiar and advantageous means carried by a planter, as hereinafter described and claimed, whereby hills are accurately positioned or checked without the employment of a cable or wire or other means extraneous to the planter, with the result that it is unnecessary at the end of a row for the driver to dismount to reset a cable or for any other purpose.

In the accompanying drawings, hereby made a part hereof:

The figure is a left hand side elevation of a planter equipped with the preferred embodiment of my invention.

In general, my novel planter may be of the ordinary well known construction or of any other construction compatible with the use of my improvement. The said planter comprises the usual frame 1, axle 2, ground wheels 3 on said axle, seed boxes 4, and transverse shaft 5 for opening and closing the valves complementary to the seed boxes. In furtherance of my invention I provide an arm 6 on the said shaft 5, and I also provide on the axle 2 a sprocket gear 7. A sprocket belt 12 is carried around the gear 7 and also around a sprocket gear 13, and a third sprocket gear 14, the latter being mounted as shown and being provided with tappets 16 adapted to coöperate with the arm 6 in opening the valves of the seed boxes at intervals incidental to the forward movement of the planter.

Fixed on the same shaft as the sprocket gear 14 is a sprocket gear 17. This latter is connected through a sprocket belt 18 with a sprocket gear 19 that is fixed with respect to a vertically disposed cam 20, whereby rotation of the said cam 20 will attend rotation of the sprocket gear 14. The cam 20 has for its function to raise and suddenly release a marking plunger 21. This plunger 21 is mounted as shown or is guided in its up and down movements in any other approved manner; and it is preferably weighted, as indicated at 22, and is equipped with an anti-friction roller 23, opposed, as shown, to the edge of the cam. At 24 is a spring that is put under tension by raising of the marking plunger 21 and operates when the plunger is suddenly released to forcibly impel the same downwardly. For the purpose of detachably fastening the plunger 21 in raised and idle position, I provide the said plunger with an abutment 25 for the engagement of a spring-pressed detent 26, which latter is preferably connected through a link rod 27 with a hand lever 28, said hand lever being adapted to be adjustably fixed in conventional manner, which is not of the essence of my invention.

It will be apparent from the foregoing that when the sprocket gear 14 is rotated, the tappets 16, by coöperation with the arm 6 will open the valves of the seed boxes at intervals; and it will also be apparent that when the detent 26 is disengaged from the plunger 21, the plunger will be raised by the action of the cam 20 and when released from the cam will be forcibly driven downwardly by the spring 24.

The plunger 21 and pointer 30 at the side of the planter are used for the purpose of indicating the position of the seed hills at the end of a traverse across a field, so as to assure the hills being spaced in such manner as to provide straight rows perpendicular to the path of the planter as is desirable for proper cultivation. The plunger 21 is positioned approximately a foot beyond the path of the planter wheel, so as to shorten the rod of the pointer 30, and the plunger is also positioned so as to be in line with the hills as dropped by the planter coincident with operation of the plunger.

The pointer 30 is pivoted on the plunger 21 and is designed to be connected through the medium of a cable 31 with a similar pointer at the opposite side of the plunger, the latter pointer not being illustrated. The cable 31 is also connected with the hand lever 28 so that lowering of the pointer at one side of the planter effects raising of the pointer at the other side thereof. When it is not desired to use either pointer they are held upright by knotting the cable or otherwise temporarily shortening the same.

In the practical operation of a planter equipped with my improvement, the hills are properly checked through the medium of the tripping mechanism described. The plunger 21 is normally held out of operation by the detent 26. As the planter approaches the end of a row, however, the plunger 21 is released, whereupon the plunger will make depressions in the ground at intervals and thereby indicate the exact position of the seed hills. Then after the planter has been turned to make a return trip the proper pointer 30 is moved downwardly. With this done, the planter is set with the pointer over the depression made by the plunger in the ground. When this operation is properly carried out it will be observed that the rows about to be planted will have the same positions of hills as the previous rows.

Having described my invention, what I claim and desire to secure by Letters Patent, is:—

A seed planter comprising a seed valve, an arm complementary thereto, a gear equipped with tappets to engage said arm, means to drive said gear, a cam, an auxiliary driving connection to the cam, a rectilinearly movable marking plunger having means opposed to the cam, and also having an abutment, a spring to forcibly impel the plunger downwardly, said spring being constructed and arranged to be put under tension by the raising of the plunger through the medium of the cam, a spring-pressed detent complementary to the abutment of the plunger to retain the plunger against downward movement, a lever, a connection between said detent and lever, means to adjustably fix the lever, and a pointer pivotally connected to the lower portion of the plunger and also connected with said lever.

In testimony whereof I affix my signature.

RALPH H. ATZ.